US008824396B2

(12) United States Patent
Pedersen et al.

(10) Patent No.: US 8,824,396 B2
(45) Date of Patent: Sep. 2, 2014

(54) OVERHEAD REDUCTION FOR MULTI-CARRIER TRANSMISSION SYSTEMS

(75) Inventors: Klaus Ingemann Pedersen, Aalborg (DK); Yuanye Wang, Aalborg (DK)

(73) Assignee: Nokia Siemens Networks Oy, Espoo (FI)

(*) Notice: Subject to any disclaimer, the term of this patent is extended or adjusted under 35 U.S.C. 154(b) by 198 days.

(21) Appl. No.: 13/378,157

(22) PCT Filed: Jun. 15, 2009

(86) PCT No.: PCT/EP2009/004299
§ 371 (c)(1),
(2), (4) Date: Feb. 22, 2012

(87) PCT Pub. No.: WO2010/145673
PCT Pub. Date: Dec. 23, 2010

(65) Prior Publication Data
US 2012/0155408 A1    Jun. 21, 2012

(51) Int. Cl.
*H04W 4/00* (2009.01)
*H04W 28/06* (2009.01)
*H04L 1/18* (2006.01)
*H04L 1/00* (2006.01)
*H04L 5/00* (2006.01)

(52) U.S. Cl.
CPC ............ *H04W 28/06* (2013.01); *H04L 1/1812* (2013.01); *H04L 1/0026* (2013.01); *H04L 1/1825* (2013.01); *H04L 1/0029* (2013.01); *H04L 5/0007* (2013.01)
USPC ......................................... 370/329; 370/252

(58) Field of Classification Search
USPC ......................................... 370/252, 329–341
See application file for complete search history.

(56) References Cited

U.S. PATENT DOCUMENTS

| 6,944,149 B1* | 9/2005 | Kim et al. ................ 370/349 |
| 7,961,672 B2* | 6/2011 | Varadarajan et al. ....... 370/328 |
| 2006/0285522 A1* | 12/2006 | Kim et al. ............... 370/331 |
| 2008/0049712 A1 | 2/2008 | Terabe et al. ............. 370/348 |
| 2011/0009157 A1* | 1/2011 | Osterling et al. .......... 455/522 |

FOREIGN PATENT DOCUMENTS

EP    1 761 097 A2    3/2007

OTHER PUBLICATIONS

Wang, Y., et al., "Uplink Overhead Analysis and Outage Protection for Multi-Carrier LTE-Advanced Systems", Sep. 14, 2009, IEEE Conference Proceedings, Tokyo, Japan, 5 pgs.
3GPP TR 36.814 V0.4.1 (Feb. 2009), "$3^{rd}$ Generation Partnership Project; Technical Specification Group Radio Access Network; Further Advancements for E-UTRA Physical Layer Aspects (Release 9)", 31 pgs.
3GPP TS 36.213 V8.6.0 (Mar. 2009), $3^{rd}$ Generation Partnership Project; Technical Specification Group Radio Access Network; Evolved Universal Terrestrial Radio Access (E-UTRA); Physical Layer Procedures (Release 8), 77 pgs.

* cited by examiner

Primary Examiner — Kan Yuen
(74) Attorney, Agent, or Firm — Harrington & Smith

(57) ABSTRACT

A method, apparatus, and computer program product, wherein a channel quality information received from a user in a multi-carrier transmission system is categorizing on a per-user basis, and one of a plurality of feedback overhead reduction techniques is individually selected for the user in response to a result of the channel categorization.

14 Claims, 4 Drawing Sheets

OVERHEAD REDUCTION FOR MULTI-CARRIER TRANSMISSION SYSTEMS

FIELD OF THE INVENTION

The present invention relates to a method, apparatus, and computer program product for scheduling transmission in a multi-carrier transmission system, such as an OFDM (Orthogonal Frequency Division Multiplexing) based transmission system (e.g. wireless local area network (WLAN), Worldwide Interoperability for Microwave Access (WiMAX), and 3.9 G/Long Term Evolution (LTE)).

BACKGROUND OF THE INVENTION

The capacity for wireless communication systems has gone through dramatic increase during the last few years, and it is foreseen that this growth will continue in the future. In order to meet the increasing capacity requirement for the next generation systems, as specified by International Telecommunications Union-Radio Communication Sector (ITU-R), the 3rd Generation Partnership Project (3GPP) is now evolving the current Long Term Evolution (LTE) system towards the advanced version, the so called "LTE-Advanced".

LTE-Advanced requires a bandwidth of up to 100 MHz, which is much wider than 20 MHz of the current LTE system. The current spectrum utilization pattern excludes the possibility of assigning a contiguous wideband. Therefore, carrier aggregation (CA) of individual component carriers (CCs) has been proposed. This leads to a multi-carrier transmission system. In order to maintain backward compatibility, independent layer-1 (physical layer) transmission can be used, which is in coherence with the LTE Rel'8 assumptions on each CC, as proposed e.g. in 3GPP TR 36.814 v1.0.0, "Evolved Universal Terrestrial Radio Access (E-UTRA); Further advancements for E-UTRA Physical layer aspects," February, 2009.

With independent layer-1 transmission on each CC, feedback of a channel quality information (e.g. Channel Quality Indicator (CQI)) and an acknowledgement e.g. Ack/Nack) per CC may be required, as proposed e.g. in 3GPP TS 36.213 v8.6.0, "Evolved Universal Terrestrial Radio Access (E-UTRA); Physical layer procedures," March, 2009.

However, such uplink signaling may contribute to a large amount of transmission overhead. Moreover, when multiple-input multiple-output (MIMO) transmission is used, the overhead is further increased because of the requirement for signaling additional control information (e.g. a Precoding Matrix Indicator (PMI) and/or a Rank Indication (RI). In addition to inefficiency caused by heave uplink overhead, some cell-edge users that are power limited cannot support the uplink transmission over multiple CCs and will thus be in an outage situation. A problem is basically how to achieve better downlink performance for a multi-carrier system, while still trying to limit the uplink feedback overhead from CQI and Ack/Nack's.

SUMMARY

In an embodiment a method comprises:
categorizing on a per-user basis a channel quality information received from a user in a multi-carrier transmission system; and
individually selecting for the user one of a plurality of feedback overhead reduction techniques in response to a result of said categorizing.

Furthermore, in an embodiment an apparatus comprises:
channel categorizing means or a channel categorizer for categorizing on a per-user basis a channel quality information received from a user in a multi-carrier transmission system; and
scheduling means or a scheduler for individually selecting for said user one of a plurality of feedback overhead reduction techniques in response to a categorization output of said channel categorizing means.

Accordingly, it is individually and adaptively decided per user and corresponding channel quality which feedback overhead reduction technique to use. Thereby, performance in multi-carrier systems in one transmission direction can be improved and feedback overhead in the other transmission direction can be limited.

The channel categorization may be performed by comparing the channel quality information (which may comprise a path loss measurement value for example) with at least two threshold values.

Furthermore, according to exemplary embodiments, the plurality of feedback overhead reduction techniques may comprise at least two of a carrier restriction technique where transmission to and from the user is restricted to a single component carrier, a feedback compression technique where a channel quality feedback information for a plurality of component carriers allocated to the user is compressed, and a feedback bundling technique where a plurality of feed-back signals used for positively or negatively acknowledging transmission over a plurality of component carriers allocated to the user is bundled into a single feedback signal.

According to a more specific example, the carrier restriction technique may be applied when the channel quality information exceeds a first threshold, the feedback compression technique may be applied when the channel quality information does not exceed the first threshold but exceeds a second threshold, and the feedback bundling technique may be applied when the channel quality information does not exceed the first and second thresholds but exceeds a third threshold.

The above feedback compression technique may comprise cross component carrier compression, which means that the channel quality feedback information signalled via a specific component carrier is not only derived from the specific component carrier. Rather, it may be derived from another component carrier or a combined consideration of the specific component carrier with at least one other component carrier Additionally, a weight applied to a scheduling metric used for the user may be individually selected based on the result of the channel categorization. Thereby, packet scheduling can be modified to guarantee fairness and good cell-edge performance.

As an option, the channel categorization and feedback overhead reduction technique selection may be initiated in response to a categorization of the user as a multi-carrier user. Thus, conventional user who can only be scheduled on a single carrier may still be served and scheduled by conventional approaches.

Implementation of the proposed scheduling may be based at least in part on a computer program comprising code means for producing the above method steps when run on a computer device. The computer program may be stored on a computer-readable medium or may be downloadable from a private or public network.

Further advantageous modifications are defined in the dependent claims.

BRIEF DESCRIPTION OF THE DRAWINGS

In the following, the present invention will be described in greater detail based on embodiments with reference to the accompanying drawings, in which.

DESCRIPTION OF THE EMBODIMENT

Figure 1:
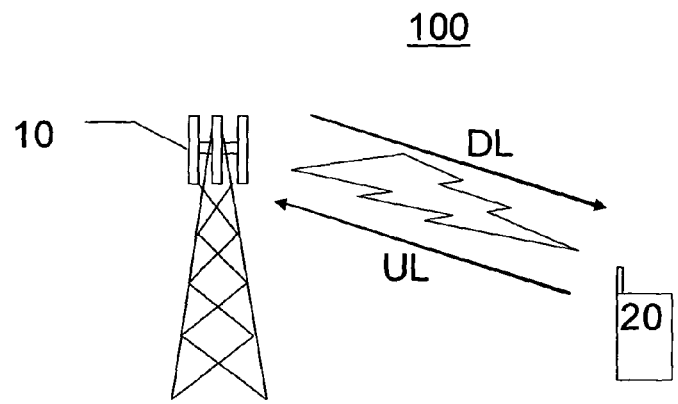
FIG. 1 shows a schematic block diagram of a communication system in which the present invention can be implemented.

Exemplary embodiments of the present invention will now be described. Indeed, the invention may be embodied in many different forms and should not be constructed as limited to the embodiments set forth herein. Rather, these embodiments are provided so that this disclosure will satisfy applicable legal requirements. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Like reference numerals refer to like elements throughout.

The present invention is applicable to any base station device, access device, server device, corresponding component, and/or to any communication system or any combination of different communication systems that support component carriers or multiple carriers. The communication system may be a fixed communication system or a wireless communication system or a communication system utilizing both fixed networks and wireless networks. The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, the embodiment.

In the following, different embodiments will be described using, as an example of a system architecture whereto the embodiments may be applied, an architecture based on an LTE-Advanced network without restricting the embodiment to such architecture, however.

A general architecture of a communication system providing an example of an environment where the present solution may be used, is illustrated in FIG. 1 which shows a simplified system architecture. It is apparent to a person skilled in the art that the communication system may also comprise other functions and structures. It should be appreciated that functions, structures, elements and protocols used in or for group communication, may be irrelevant to the actual invention. Therefore, those need not to be discussed in more detail here.

Referring to FIG. 1, a communication system 100 comprises a user equipment (UE) 20 which may be e.g. a mobile or wireless user terminal, such as a mobile phone (mobile station), a personal digital assistant (PDA), a game console, a smart phone, a personal computer (PC), a laptop, a desktop computer or the like, capable of receiving/transmitting component carrier signalling. The communication system 100 further comprises an access network (such as an evolved UMTS terrestrial radio access network of an enhanced cellular network (E-UTRAN)) which can be accessed via a network node or a component, such as a base station (enhanced Node B (eNB), E-UTRAN node B, eNodeB) 10, capable of transmitting/receiving component carrier signalling. Here it is assumed that the user equipment (UE) 20 is capable of communicating with the base station 10 by utilizing an air interface (also referred to as a radio interface). Respective arrows are depicted to indicate uplink (UL) and downlink (DL) directions. Transmission may be based on orthogonal frequency division multiplexing (OFDM) as a modulation scheme to communicate data between a signal source, such as the base station 10, and a subscriber station, such as the UE 20. OFDM enables communication of a large amount of data over a limited bandwidth by allocating the data among multiple smaller sub-signals, and then simultaneously transmitting the sub-signals using different sub-carriers.

Although discussed as a primary example herein, the present solution is not limited to E-UTRAN, LTE, and/or 3GPP systems. Thus, the present solution may also be applicable to other communications systems such as WiMAX (worldwide interoperability for microwave access) and/or WLAN (wireless local area network) and/or other multi-carrier systems.

Figure 2:
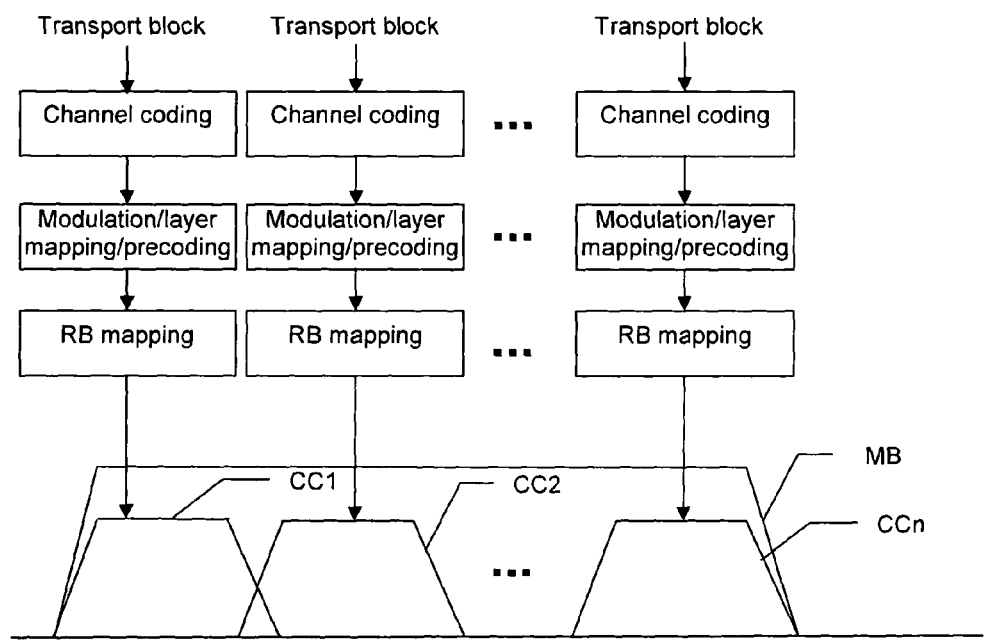
FIG. 2 shows a schematic flow diagram of a transmission chain for aggregated bandwidth.

FIG. 2 shows a schematic flow diagram of a transmission chain for aggregated bandwidth, where a total system bandwidth or maximum bandwidth MB contains a set of component carriers CC1, CC2, ... CCN. The component carriers CC1, CC2, ... CCN may be next to each other (i.e. forming a single contiguous system bandwidth), or they may be arranged to have a carrier frequency spacing significantly larger than their individual bandwidths. Supposedly, LTE-Advanced in 3GPP is going to assume carrier aggregation to form bandwidths of up to 100 MHz by having aggregation of 5 CCs of 20 MHz each. Those CCs may be contiguous or non-contiguous.

According to FIG. 2, individual transport blocks of a transmission signal, which may be obtained from higher protocol layers (e.g. Medium Access Control (MAC) layer) can be forwarded on different CCs, are segmented into code blocks. Each code block is subjected to channel coding (e.g. turbo coding) and an error code (e.g. cyclic redundancy code (CRC)) can be added. Then, the enhanced code blocks are modulated (e.g. quadrature phase shift keying (QPSK), 16 quadrature amplitude modulation (16 QAM) or 64 QAM) and subjected to layer mapping for transmit diversity, to spatial multiplexing, and to precoding. Finally, the resulting code blocks are mapped onto physical resource blocks (RB), which may be a subset of OFDM symbols or subcarriers. For extended or aggregated bandwidth, this structure is copied for each CC to provide frequency domain link adaptation on CC basis and better retransmission performance for wide bandwidth.

As LTE-Advanced should be backwards compatible, it is advantageous to have a DL radio resource management (RRM) framework, where independent transport blocks are transmitted on different CCs. This means that different modulation and coding schemes (MCS) may be used on different CCs, although transmitted to the same user. In order to facilitate such schemes with efficient frequency domain link adaptation scheduling, user terminals may provide frequency selective CQI feedback. In order to have a reasonable UL CQI overhead, new CQI reporting schemes may be used when the system bandwidth is extended from 20 MHz (which is the maximum bandwidth for LTE Rel'8) to 100 MHz.

A proposed enhanced CQI compression scheme for LTE-advanced using multiple CCs has a relatively low uplink (UL) signalling overhead, and at the same time provides sufficient information to the base station for performing an efficient frequency domain link adaptation and scheduling. To achieve this, the UE monitors a set of different CC signals transmitted, e.g. in a message, from a serving base station. The monitored set may include all CC frequencies in the total system bandwidth MB, or it may be reduced to only include a sub-set of the available CC frequencies. Information on the configuration of the monitored set may be provided from the base station to the UE by using higher layer signalling. The base station only uses the monitored set of component carriers for scheduling user data. The UE can be arranged to identify the best CC among those in the monitored set. The identification of the best CC may be based on (but is not limited to) average signal-to-interference-plus-noise-ratio (SINR) measurements per CC, or it may also be based on reference signal received quality (RSRQ) measurements. In LTE, the UE monitors so-called reference symbol (RS) signals when estimating CQI. For example, the best CC may be identified as the one with the highest SINR. SINR may be best when measuring the signals on the different CCs on the RS. A frequency selective CQI report may then be transmitted to the base station serving the UE, wherein the report may include e.g. identification information and channel quality information on the best CC. This kind of reporting may be carried out according to a so-called average best-M scheme, or it may include full CQI reporting for individual sub-bands of k contiguous physical resource blocks (PRB), as well as a wideband CQI measure for the CC. In addition to sending the detailed CQI report reporting the best CC within the monitored set, the UE may also be arranged to transmit information expressing an average channel quality of the remaining worse CCs. Such information may be sent by having individual wideband CQI reports for the worse CCs, or by expressing the relative wide-band CQI of the worse CCs compared to the wideband quality of the best CC. Thus, the base station receives detailed frequency selective channel quality information on the best CC, and may performs a frequency domain link adaptation and scheduling of resource blocks for the UE on the basis of the received CQI report. In cases where a much larger transmission bandwidth than a single CC is needed for the UE, it may be sufficient to know the average channel quality of the CCs, as in that case the base station anyway schedules the UE over large bandwidths.

The above CQI compression scheme has a clear advantage that it results in a tolerable size of the CQI reporting in the UL direction for multi-carrier systems, such as LTE-Advanced, while still providing the required information for the system to benefit from frequency domain link adaptation and scheduling. The CQI word size of the proposed scheme can be made significantly smaller than the CQI word size of scheme where the detailed CQI report is simply repeated for each component carrier. The UE may automatically adjust its reporting scheme according to the experienced channel conditions. That is, in case the channel coherence bandwidth is high (and multiple CCs are seen as "good"), the UE would do the reporting of the multiple CCs at lower resolution in the frequency domain. In cases where the channel coherence bandwidth is low, there would not be much sense in reporting with low granularity, and the UE would simply be reporting using the single-CC reporting.

Wireless digital communication always suffers from errors introduced by the channel. Error correction can be based on retransmissions e.g. by automatic repeat request schemes (ARQ). Hybrid ARQ (HARQ) is a variation of the ARQ error-control method. In standard ARQ, error-detection information bits are added to data to be transmitted (such as CRC). In HARQ, forward error correction (FEC) bits are also added to the existing error detection bits (such as Reed-Solomon code or Turbo code). As a result HARQ performs better than ordinary ARQ in poor signal conditions, but in its simplest form this comes at the expense of significantly lower throughput in good signal conditions.

Assuming a cell with multiple CCs, the base station has the freedom to schedule each LTE-Advanced user on multiple CCs. The transmission on each CC can have its own transport block and modulation and coding scheme. The default assumption may be that one Ack/Nack is sent in the UL direction for each transport block in the DL direction. Thus, scheduling a user on multiple CCs results in larger uplink overhead as more Ack/Nack's are sent. Similarly, in order to achieve the highest possible downlink frequency domain packet scheduling (FDPS gain), detailed frequency selection CQI information will have to be sent in the uplink for all CCs.

The overhead resulting from multiple Ack/Nack transmissions can be reduced by using uplink hybrid ARQ (HARQ) bundling. Here, only a single positive or negative acknowledgement (Ack/Nack) is sent in the UL direction, and a positive acknowledgement (Ack) is only sent if all transport blocks are received correctly.

However, a penalty of using the above two CQI and HARQ compression techniques when scheduling users on multiple CCs is a drop in downlink performance.

In order to further optimize the system performance, it is proposed to decide per user which feedback overhead reduction technique(s) to use, and—as a further option—how to correspondingly modify the downlink packet scheduler to guarantee fairness and good cell-edge performance.

Figure 3:
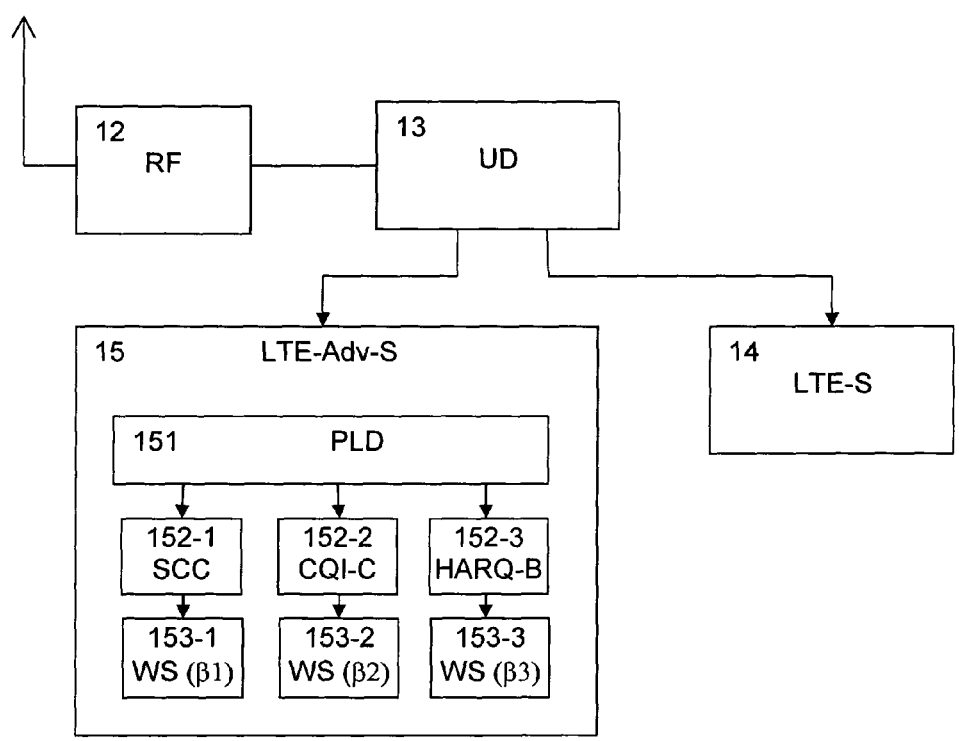
FIG. 3 shows a schematic block diagram of a base station device according to an embodiment.

FIG. 3 shows a schematic block diagram of those components which are useful to describe an embodiment of the present invention. These components may be provided in a network node or a component, such as a base station (enhanced Node B (eNB), E-UTRAN node B, eNodeB) or other wireless network access device, capable of transmitting/receiving component carrier signalling. Such components can be, for example, integrated as a chip or chip set of the base station.

The exemplary components or blocks shown in FIG. 3 comprise a radio frequency (RF) stage 12, user determination function or unit 13 (i.e. user categorizer or user categorizing means), an optional conventional scheduling function or unit (LTE-S) 14 (e.g. for conventional LTE users in the present embodiment), and an advanced scheduling function or unit (LTE-Adv-S) 15 (e.g. for LTE-Advanced user in the present embodiment). An UL signal received via the RF stage 12 is supplied to the user determination function or unit 13 in order to discriminate whether the received UL signal belongs to a conventional user whose transmission is scheduled by the conventional scheduling function or unit 14 (i.e. conventional scheduler or scheduling means) or to an advanced user whose transmission is scheduled by the advanced scheduling function or unit 15 (i.e. advanced scheduler or scheduling means).

According to an embodiment, the advanced scheduling function or unit 15 is arranged to decide for each user (which has been determined by the user determination function or unit 13 as an advanced user) individually based on received path loss measurements (or other signal or transmission quality indicators) if CQI compression and/or HARQ bundling shall be enabled, and whether the user is scheduled on single or multiple CCs. These path loss measurements can be detected and categorized by a path loss detection function or unit (PLD) 151 (i.e. channel categorizer or channel categorizing means) provided in or at the advanced scheduling function or unit 15 and arranged to trigger or activate different scheduling functions or units 152-1 to 152-3 which are then selected by the advanced scheduling function or unit 15 in response to the channel categorization output. Thereby, users with high experienced path loss can be scheduled to use a feedback compression technique such as cross CC CQI compression controlled by a CQI compression control function or unit (CQI-C) 152-2 and/or a feedback bundling technique such as HARQ bundling controlled by a HARQ bundling control function or unit (HARQ-B) 152-3, as those are the users likely to experience UL coverage limitations. Users at the very cell-edge (i.e. with path loss larger than a first threshold TS1) are best served by only scheduling them on a single CC controlled by a single CC control function or unit (SCC) 152-1. Thereby, low feedback signalling overhead can be achieved also.

As an additional option, respective weight selector function or units 153-1 to 153-3 (i.e. weighting means) may be provided to introduce an individual weighting based on the decided scheduling functions. In order to maintain fairness and good cell-edge performance, users scheduled only on a single CC, may have their scheduling metric weighted by a first weight selector function or unit 153-1 with $\beta 1$, which is a value larger than 1. Weighting of the scheduling metric with $\beta 1$ basically results in giving the user larger priority when assigning transmission resources to the user. Similarly, users with cross CC CQI compression and HARQ bundling also have their scheduling metric weighted by respective first and second weight selection functions or units 153-2 and 153-3 with $\beta 2$ and $\beta 3$, respectively, to compensate for potential loss from using uplink compression techniques.

It is noted that the functions or units indicated in FIG. 3 can be implemented as discrete hardware circuits or as processing functions controlled by a processor or central processing unit (CPU) provided in the base station.

Figure 4:
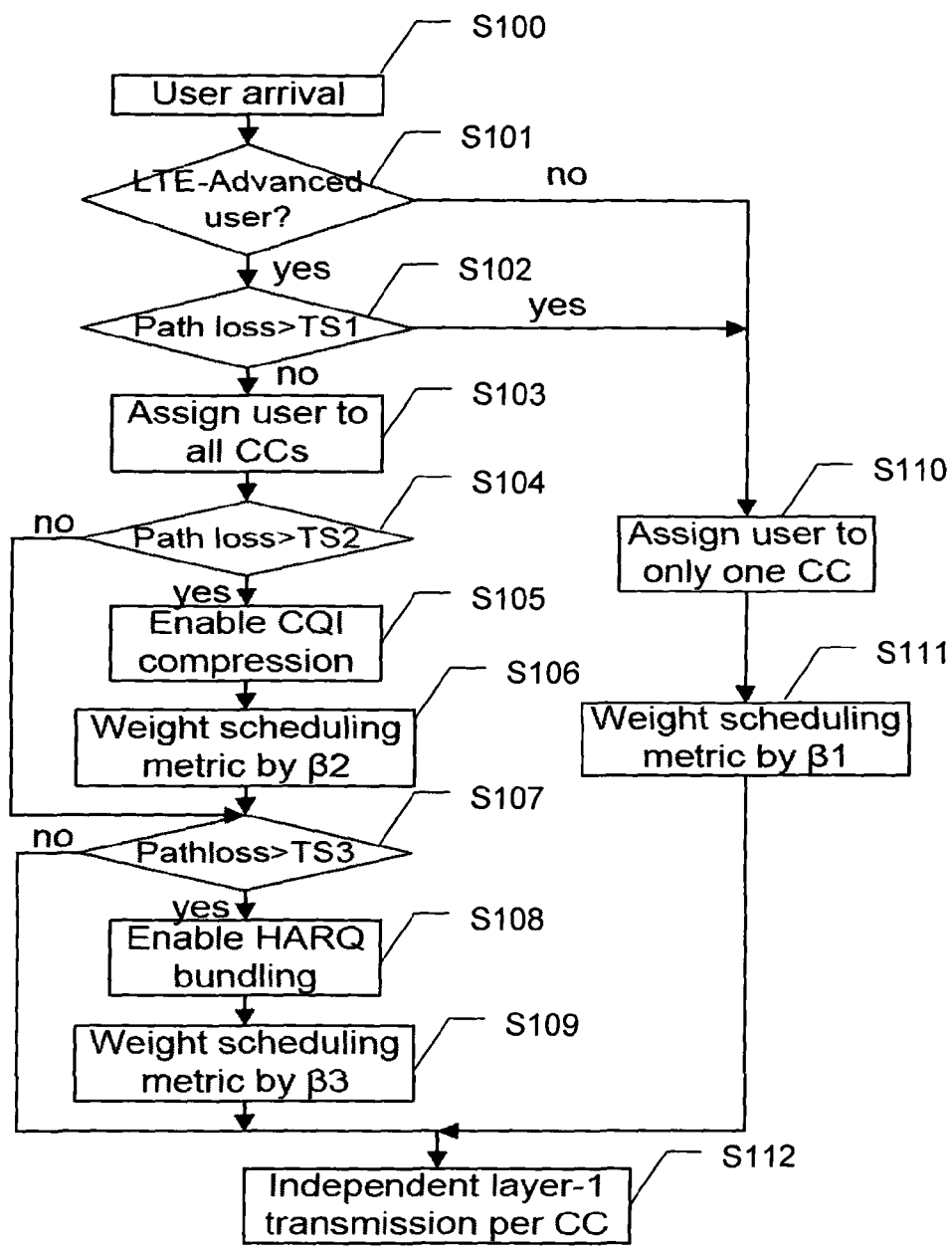
FIG. 4 shows a flow diagram of an enhanced scheduling procedure with rules for configuration of UL feedback signalling per user according to an embodiment.

FIG. 4 shows a flow diagram of an enhanced scheduling procedure according to an embodiment. The selected individual scheduling functions may operate in different protocol layers and offer different levels of overhead reduction and/or protection.

When a new user arrives, the procedure first categorizes the user in step S100 according to the terminal type, i.e. a LTE-Advanced terminal or a conventional LTE terminal (e.g. LTE Rel'8 terminal). The conventional LTE user supports the transmission on only one CC and the base station (e.g. the conventional scheduling function or unit 14 of FIG. 3) needs to select a proper CC, and assign it to the user (step S110). Then, in step S111, a weight scheduling metric by $\beta 1$ is applied. Finally, in step S112, an independent layer-1 transmission is initiated per CC.

If the user is determined in step S101 as an LTE-Advanced user, it can potentially be scheduled on all available CCs. Therefore, user quality or transmission quality is checked in step S102. According to the user quality (in the present embodiment, the path loss value to the user's serving base station is used as a quality indicator), a LTE-Advanced user will be assigned in step S103 to all CCs if it is determined in step S102 that its measured path loss is higher than a first threshold TS1. Otherwise, it will be assigned to only one CC in step S110. The selection of CC to those users with poor channel quality could be done in such a way that the load across the multiple CCs is balanced.

In order for the users that have only one CC to get comparable amount of resource as those with multiple CCs, their scheduling priority could be increased. This is done in step S111 by weighting the scheduling metric with a factor $\beta 1$.

For LTE-Advanced users that are scheduled in step S103 onto multiple CCs, the measured path loss is checked again in step S104. If it is determined that their path loss values lie above a second threshold TS2, their CQI feedback is controlled to be compressed (step S105). CQI compression may be performed by calculating a wideband CQI for each user on all CCs. Then, for the CC with the highest wideband CQI value, both the wideband CQI and the frequency selective CQI values can be fed back. This means, one CQI value is signaled for each PRB group. According to the 3GPP specification, each PRB is constituted with 12 consecutive sub-carriers, and one PRB group contains 3 neighboring PRBs. For the remaining CCs with low wideband CQI, only one CQI value is fed back per CC, which is the wideband CQI.

In step S106, the scheduling priority for the users with CQI compression is increased by weighting the scheduling metric by $\beta 2$ in order for fair completion of resources with those who have full CQI knowledge.

For those LTE-Advanced users whose path loss values were less or equal the second threshold TS2, the measured path loss is checked again in step S107. If it is determined in step S107 that their path loss values lie above a third threshold TS3, adaptive HARQ bundling is applied in step S108, so that multiple Ack/Nacks are bundled into one Ack/Nack signal for users with poor path loss. For the remaining users with path loss values below the third threshold TS3, independent Ack/Nack feedback per CC is assumed. For the same reason of preventing the cell-edge users from a reduced downlink throughput, HARQ bundling could again be performed together with increased scheduling priority by weighting the scheduling metric by $\beta 3$ in step S109. Finally, the flow proceeds to step S112 where an independent layer-1 transmission is initiated per CC.

After having described the feedback reduction techniques, the problem of how to improve the scheduling priority for cell-edge users by weighting their scheduling metric is described. The packet scheduler used in layer-2 may apply a Proportional Fair (PF) approach, which corresponds to a channel aware scheduler. On each CC, it assigns resource to a user that maximizes the metric:

$$k_{i,j} = \underset{k}{\operatorname{argmax}} \{\operatorname{Metric}_{k,i,j}\} \qquad (1)$$

where $k_{i,j}$ is the selected user on the $i^{th}$ CC at the $j^{th}$ PRB group. A conventional way to calculate the PF metric could be:

$$\operatorname{Metric}_{k,i}, j = \frac{R_{k,i,j}}{\tilde{R}_{k,i}} \qquad (2)$$

where $R_{k,i,j}$ is the achievable throughput for user k on the $i^{th}$ CC at the $j^{th}$ PRB group and $\tilde{R}_{k,i}$ is the average throughput for user k on the $i^{th}$ CC. When users are assigned with different number of CCs, the independent packet scheduling per CC gives poor coverage performance. A solution to improve the coverage is to use the user throughput over all CCs in the denominator of equation 2. Furthermore, by weighting the scheduling metric with a factor $\beta_x$ ($x \in [1,2,3]$), the scheduling priority for the cell-edge users with uplink overhead or outage reduction can be increased, and the new scheduling metric can be calculated as:

$$\operatorname{Metric}_{k,i,j} = \frac{R_{k,i,j}}{\sum_{i=1}^{N} \tilde{R}_{k,j}} * \prod_{x=1}^{3} \beta_x^{I_x} \qquad (3)$$

In equation 3, $\beta_x$ is the scaling factor for the proposed technique. $I_x$ equals 1 if the corresponding technique is used. Otherwise, it has the value of 0. N is the number of aggregated CCs in the system. It is noted that, it may not be necessary to switch on all the proposed techniques at the same time. Based on the trade-off between downlink performance and overhead or outage reduction, enabling of one or two of the proposed scheduling techniques may be enough.

As can be gathered from FIG. 4, two different path loss thresholds (TS2 and TS3) are used for deciding when CQI compression and HARQ bundling shall be enabled. The reason for proposing this solution is because the largest reduction in uplink signalling overhead is achieved via CQI compression, while at the same time it results in larger penalty of the downlink performance. On the contrary, using HARQ bundling leads to a smaller reduction of uplink signaling overhead, with only marginal loss in downlink performance. Hence, it makes sense to first use HARQ bundling for the coverage protection, then use cross CC CQI compression if a user's path loss is so high that HARQ bundling fails to provide the desired protection. For the users with extremely high path loss values, they should be scheduled with only one CC, so that the uplink overhead and transmit power is minimized.

In the proposed procedure of FIG. 4, TS1, TS2, and TS3 are path loss threshold parameters. Those parameters could be operator controlled, e.g. configured to a fixed value. Or they could be slowly adapted to further optimize the system performance (e.g. using a self optimization scheme for dynamically tuning the settings of these parameters).

Similarly, β1, β2, and β3 are scheduling metric scheduling parameters. Those parameters could either be fixed, or adaptively adjusted on a time-scale much slower that packet scheduling.

In the following, the amount of overhead required for the CQI and Ack/Nack feedback with the proposed techniques is quantified. Only single stream transmission is assumed, so that no PMI or RI feedback is required. The CQI reporting is assumed to be carried out periodically with a feedback interval of every 5 transmission time intervals (TTIs), whereas the Ack/Nack is assumed to be sent out every TTI.

The CQI reporting mode is assumed to be Mode 3-0 according to 3GPP specification TS 36.213 v8.6.0, which specifies that for each CC, the feedback should contain the wideband CQI value plus the selective CQI reporting for each sub-band. One sub-band contains k consecutive PRBs. The number of PRB groups is thus:

$$M = \lceil N_{PRB}/k \rceil = 17 \quad (4)$$

where $N_{PRB}$ is the number of downlink PRBs per CC, with 10 MHz bandwidth per CC, it has the value of 50. ⌈ ⌉ means the ceil function. With 1 dB resolution for the CQI reporting, 5 bits are enough for quantification of up to 32 different levels. The total required number of bits for the full CQI reporting is:

$$N \times (5 \times M + 5) = 360 \text{ bits} \quad (5)$$

where N=4 is the number of aggregated carriers in a LTE-Advanced system. In each TTI, 360/5=72 bits are required for full CQI reporting. As to Ack/Nack signaling, one bit is sufficient for one data-stream. The total required number of bits for the feedback of both full CQI and independent Ack/Nacks is $$72(\text{for } CQI) + 4(\text{ack/nack}) = 76 \quad (6)$$

A conventional LTE user or a LTE-Advanced user with path loss higher than TS1 is assigned with only 1 CC. The feedback overhead is thereby 1/N as compared with assigned onto all CCs. 19 bits are required in this case.

By enabling HARQ bundling for cell-edge users (path loss higher than TS2), the feedback overhead can be reduced, as only 1 Ack/Nack is sent out for the reception of all 4 data streams. This reduces the overhead by N−1=3 bits. As a result, 73 bits are required.

According to FIG. 4, the adaptive CQI compression technique compresses the CQI feedback for users with path loss higher than TS3. Full CQI is thus transmitted on one CC, and only the wideband CQI values are transmitted for the remaining 3 CCs. The required number of bits is:

$$(5 \times M + 5 \times N)/5 + 4 = 25 \quad (7)$$

For users with path loss values higher than max{TS2, TS3}, but lower than TS1, it will still be transmitted over all 4 CCs, but with CQI compression and HARQ bundling enabled at the same time. For those users, the number of required bits for feedback is:

$$(5 \times M + 5 \times N)/5 + 1 = 22 \quad (8)$$

By increasing the weighting factor β, there is a continuous loss in average cell throughput. This is because the good users are getting less and less resources for transmission.

In terms of coverage, increasing β up to a certain value will provide gain, as poor users are prioritized and they get more resources than with a low value of β. However, a further increase of β beyond a certain level (around 2.0~2.5) will actually decrease the coverage performance. The reason is that increasing the weighting factor will cause the poor users to be scheduled even if their channel quality is poor. It thereby decreases the frequency domain packet scheduling gain as the diversity is not fully exploited. When the loss in frequency domain diversity is larger than the gain in additional transmission resources, even the coverage performance will decrease.

Figure 5:
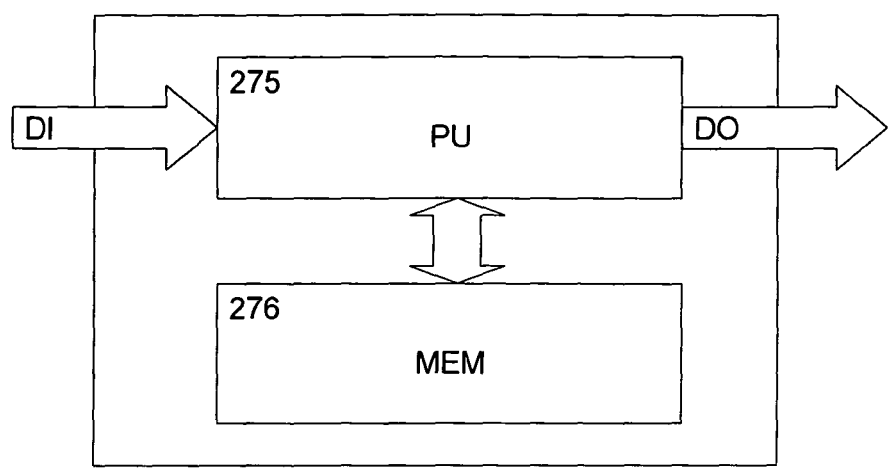
FIG. 5 shows a schematic block diagram of a software-based implementation according to an embodiment.

FIG. 5 shows a schematic block diagram of an alternative software-based embodiment of the proposed functionalities at the base station. This embodiment comprises a processing unit (PU) 275, which may be any processor or computer device with a control unit which performs control based on software routines of a control program stored in a memory (MEM) 276. Program code instructions are fetched from the memory 276 and are loaded to the control unit of the processing unit 275 in order to perform the processing steps of the above functionalities described in connection with the block diagram of FIG. 3 or the flow diagram of FIG. 4. These processing steps may be performed on the basis of input data DI and may generate output data DO, wherein the input data DI may correspond to a transport block or code block to be scheduled at the network side (e.g. base station). The output data DO may correspond to the user or control data transmitted by the base station in the DL direction. Of course, the procedure can be applied in the uplink direction as well, so that terminal side and network side could be exchanged.

The processing unit 275 may comprise a computer processor, application-specific integrated circuit (ASIC), field-programmable gate array (FPGA), and/or other hardware components that have been programmed in such a way to carry out one or more functions of an embodiment. It may further comprise a unit for executing the functionalities of the present solution as described above. The unit may be software and/or software-hardware and/or firmware components (recorded indelibly on a medium such as read-only-memory or embodied in hard-wired computer circuitry). The memory 276 may include volatile and/or non-volatile memory and typically stores content, data, or the like. For example, the memory 276 may store computer program code such as software applications or operating systems, information, data, content, or the like for the processing unit 275 to perform steps associated with operation of the base station in accordance with the above embodiments. The memory may be, for example, random access memory (RAM), a hard drive, or other fixed data memory or storage device. Further, the memory, or part of it, may be removable memory detachably connected to the apparatus.

The techniques described above may be implemented by various means so that an apparatus implementing one or more functions of a corresponding mobile entity described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation can be through modules (e.g., procedures, functions, and so on) that perform the functions described herein. The software codes may be stored in any suitable, processor/computer-readable data storage medium(s) or memory unit(s) or article(s) of manufacture and executed by one or more processors/computers.

Generally, any method step is suitable to be implemented as software or by hardware without changing the idea of the invention in terms of the functionality implemented. Method steps and/or devices, units or means likely to be implemented as hardware components at the above-defined apparatuses, or any module(s) thereof, (e.g., devices carrying out the functions of the apparatuses according to the embodiments as described above, UE, base station, as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components.

Furthermore, devices, units or means (e.g. the above-defined embodiments, or any one of their respective functions or units) can be implemented as individual devices, units or means, but this does not exclude that they are implemented in a distributed fashion throughout the system, as long as the functionality of the device, unit or means is preserved.

A claimed apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor.

In summary, a method, apparatus, and computer program product have been described, wherein a channel quality information received from a user in a multi-carrier transmission system is categorizing on a per-user basis, and one of a plurality of feedback overhead reduction techniques is individually selected for the user in response to a result of the channel categorization.

It is noted that the present invention can be implemented or used in any multi-carrier transmission system where scheduling is performed. More specifically, the present invention can be applied in radio systems like e.g. WiMAX as currently standardized in 3GPP for WCDMA (Wideband Code Division Multiple Access), as well as 3GPP E-UTRAN (Enhanced Universal Mobile Telecommunications System (UMTS) Terrestrial Radio Access Network), such as LTE (Long Term Evolution) or 3.9G. These radio access technologies (e.g. WLAN, WiMAX, E-UTRAN or 3G LTE) may involve multiple-input multiple-output (MIMO) systems or multi-beam/multi-antenna transmitter or receiver devices (e.g. base station devices, access points or other access devices) capable of receiving signals via different receiving paths and/or channels.

As already mentioned, the embodiments can be realized in hardware, software, or a combination of hardware and software. A typical combination of hardware and software can be a processing system with an application that, when being loaded and executed, controls the processing system such that it carries out the methods described herein. The embodiments also can be embedded in an application product, which comprises all the features enabling the implementation of the methods described herein, and which when loaded in a processing system is able to carry out these methods.

The terms "computer program," "software," "application," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a subroutine, a function, a procedure, an object method, an object implementation, an executable application, an applet, a servlet, a source code, an object code, a shared library/dynamic load library and/or other sequence of instructions designed for execution on a processing system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (e.g., open language). Accordingly, the above predetermined embodiments may vary within the scope of the attached claims.

The invention claimed is:

1. A method comprising:
    categorizing on a per-user basis a channel quality information received from a user in a multi-carrier transmission system; and
    individually selecting for said user one of a plurality of feedback overhead reduction techniques in response to a result of said categorizing;
    wherein a carrier restriction technique for restricting transmission to and from said user to a single component carrier is applied in response to said channel quality information exceeding a first threshold;
    wherein a feedback compression technique for compressing a channel quality feedback information for a plurality of component carriers allocated to said user is applied in response to said channel quality information not exceeding said first threshold but exceeding a second threshold; and
    wherein a feedback bundling technique for bundling a plurality of feedback signals used for acknowledging or non-acknowledging transmission into a single feedback signal over a plurality of component carriers allocated to said user is applied in response to said channel quality information not exceeding said first and second thresholds but exceeding a third threshold.

2. The method according to claim 1, wherein said categorizing is performed by comparing said channel quality information with at least two threshold values.

3. The method according to claim 1, wherein said feedback compression technique comprises cross component carrier compression.

4. The method according to claim 1, further comprising individually selecting, based on said result of said categorizing, a weight applied to a scheduling metric used for said user.

5. The method according to claim 1, wherein said channel quality information comprises a path loss measurement value.

6. The method according to claim 1, wherein said categorizing and selecting is initiated in response to a categorization of said user as a multi-carrier user.

7. An apparatus comprising one or more processors and one or more memories including computer program code, the one or more memories and the computer program code being configured, with the one or more processors, to cause the apparatus to perform at least the following:
 categorizing on a per-user basis a channel quality information received from a user in a multi-carrier transmission system; and
 individually selecting for said user one of a plurality of feedback overhead reduction techniques in response to a result of said categorizing;
 wherein a carrier restriction technique for restricting transmission to and from said user to a single component carrier is applied in response to said channel quality information exceeding a first threshold;
 wherein a feedback compression technique for compressing a channel quality feedback information for a plurality of component carriers allocated to said user is applied in response to said channel quality information not exceeding said first threshold but exceeding a second threshold; and
 wherein a feedback bundling technique for bundling a plurality of feedback signals used for acknowledging or non-acknowledging transmission into a single feedback signal over a plurality of component carriers allocated to said user is applied in response to said channel quality information not exceeding said first and second thresholds but exceeding a third threshold.

8. The apparatus according to claim 7, wherein said categorizing is performed by comparing said channel quality information with at least two threshold values.

9. The apparatus according to claim 7, wherein the one or more memories and the computer program code are further configured, with the one or more processors, to cause the apparatus to perform at least the following: individually applying, based on said result of said categorizing, a weight to a scheduling metric used for said user.

10. The apparatus according to claim 7, wherein the one or more memories and the computer program code are further configured, with the one or more processors, to cause the apparatus to perform at least the following: categorizing said user and performing said channel categorizing and said scheduling in response to said user being categorized as a multi-carrier user.

11. A base station device comprising an apparatus according to claim 7.

12. A non-transitory computer program product comprising code stored in a non-transitory computer readable memory for performing at least the following when run on a computer device:
 categorizing on a per-user basis a channel quality information received from a user in a multi-carrier transmission system; and
 individually selecting for said user one of a plurality of feedback overhead reduction techniques in response to a result of said categorizing;
 wherein a carrier restriction technique for restricting transmission to and from said user to a single component carrier is applied in response to said channel quality information exceeding a first threshold;
 wherein a feedback compression technique for compressing a channel quality feedback information for a plurality of component carriers allocated to said user is applied in response to said channel quality information not exceeding said first threshold but exceeding a second threshold; and
 wherein a feedback bundling technique for bundling a plurality of feedback signals used for acknowledging or non-acknowledging transmission into a single feedback signal over a plurality of component carriers allocated to said user is applied in response to said channel quality information not exceeding said first and second thresholds but exceeding a third threshold.

13. The non-transitory computer program product according to claim 12, wherein said categorizing is performed by comparing said channel quality information with at least two threshold values.

14. The non-transitory computer program product according to claim 12, wherein said feedback compression technique comprises cross component carrier compression.

* * * * *